United States Patent
Mougin et al.

(10) Patent No.: US 9,117,833 B2
(45) Date of Patent: Aug. 25, 2015

(54) METHOD AND DEVICE FOR PROTECTING AN INTEGRATED CIRCUIT AGAINST BACKSIDE ATTACKS

(71) Applicant: STMicroelectronics (Grenoble 2) SAS, Grenoble (FR)

(72) Inventors: Stephane Mougin, Crolles (FR); Cedric Tubert, Sassenage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 13/901,378

(22) Filed: May 23, 2013

(65) Prior Publication Data

US 2013/0314121 A1 Nov. 28, 2013

(30) Foreign Application Priority Data

May 24, 2012 (FR) ...................................... 12 54759

(51) Int. Cl.
*H01L 31/062* (2012.01)
*H01L 31/113* (2006.01)
*H01L 23/00* (2006.01)
*G06F 21/75* (2013.01)
*G06F 21/86* (2013.01)

(52) U.S. Cl.
CPC .............. *H01L 23/576* (2013.01); *G06F 21/75* (2013.01); *G06F 21/86* (2013.01)

(58) Field of Classification Search
CPC ........ H01L 23/576; G06F 21/86; G06F 21/75
See application file for complete search history.

(56) References Cited

U.S. PATENT DOCUMENTS

| | | | |
|---|---|---|---|
| 4,440,172 A * | 4/1984 | Langer | 607/4 |
| 4,740,708 A * | 4/1988 | Batchelder | 250/559.41 |
| 5,053,992 A | 10/1991 | Gilberg et al. | |
| 5,227,313 A * | 7/1993 | Gluck et al. | 438/66 |
| 5,244,817 A * | 9/1993 | Hawkins et al. | 438/64 |
| 5,325,430 A * | 6/1994 | Smyth et al. | 713/192 |
| 5,606,482 A * | 2/1997 | Witmer | 361/93.7 |
| 6,168,965 B1 * | 1/2001 | Malinovich et al. | 438/66 |
| 6,169,319 B1 * | 1/2001 | Malinovich et al. | 257/447 |
| 2002/0130248 A1 * | 9/2002 | Bretschneider et al. | 250/214 R |
| 2003/0141434 A1 * | 7/2003 | Ishikawa et al. | 250/208.1 |
| 2006/0081912 A1 * | 4/2006 | Wagner et al. | 257/316 |
| 2006/0180939 A1 * | 8/2006 | Matsuno | 257/773 |
| 2009/0201393 A1 * | 8/2009 | Tai et al. | 348/243 |
| 2009/0294811 A1 * | 12/2009 | Rhodes et al. | 257/292 |
| 2010/0159632 A1 * | 6/2010 | Rhodes et al. | 438/73 |
| 2010/0178722 A1 * | 7/2010 | de Graff et al. | 438/65 |
| 2011/0168875 A1 | 7/2011 | Okuda | |

(Continued)

FOREIGN PATENT DOCUMENTS

| | | |
|---|---|---|
| DE | 19601390 A1 | 7/1997 |
| DE | 10101281 C1 | 6/2002 |

*Primary Examiner* — Jarrett Stark
(74) *Attorney, Agent, or Firm* — Seed IP Law Group PLLC

(57) ABSTRACT

A method for detecting an attack, such as by laser, on an electronic microcircuit from a backside of a substrate includes forming the microcircuit on the semiconductor substrate, the microcircuit comprising a circuit to be protected against attacks, forming photodiodes between components of the circuit to be protected, forming a circuit for comparing a signal supplied by each photodiode with a threshold value, and forming a circuit for activating a detection signal when a signal at output of one of the photodiodes crosses the threshold value.

21 Claims, 3 Drawing Sheets

(56) References Cited

U.S. PATENT DOCUMENTS

| | | | |
|---|---|---|---|
| 2012/0175571 A1* | 7/2012 | Sarkar | 252/582 |
| 2012/0320480 A1* | 12/2012 | Lisart et al. | 361/88 |
| 2013/0100559 A1* | 4/2013 | Kuenemund et al. | 361/42 |
| 2013/0200371 A1* | 8/2013 | Marinet et al. | 257/48 |
| 2013/0278284 A1* | 10/2013 | Watanabe et al. | 326/8 |
| 2013/0314121 A1* | 11/2013 | Mougin et al. | 326/8 |

* cited by examiner

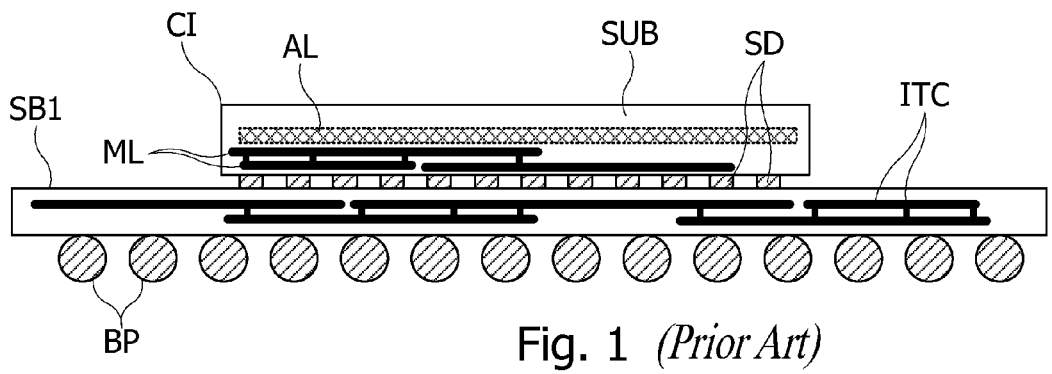
Fig. 1 *(Prior Art)*
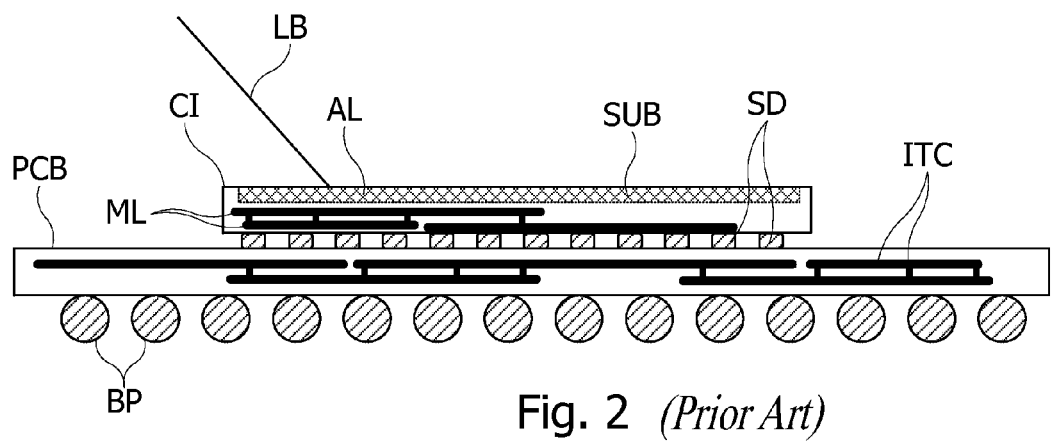
Fig. 2 *(Prior Art)*
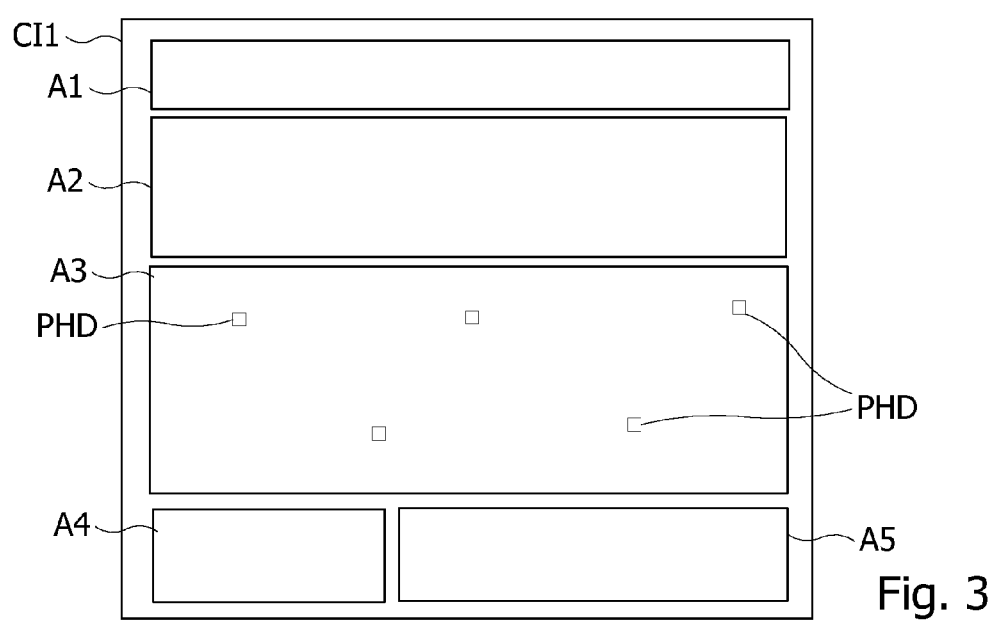
Fig. 3

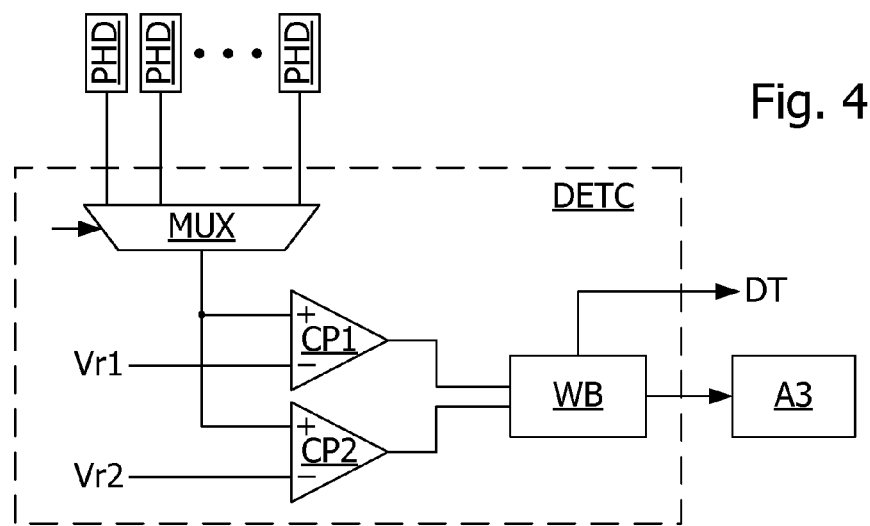
Fig. 4
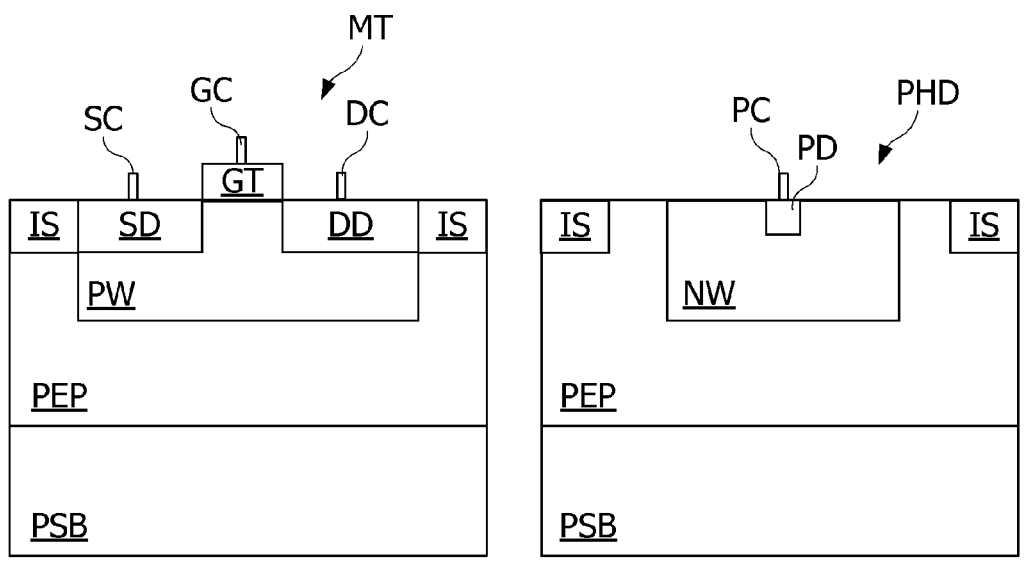
Fig. 5A
Fig. 5B

METHOD AND DEVICE FOR PROTECTING AN INTEGRATED CIRCUIT AGAINST BACKSIDE ATTACKS

BACKGROUND

1. Technical Field

The present disclosure relates to a method for protecting an integrated circuit against attacks aiming to discover sensitive data stored or handled by the integrated circuit. The present disclosure particularly relates to attacks made by means of a light beam such as a laser beam, through the semiconductor substrate on which the circuit is formed.

2. Description of the Related Art

Integrated circuits are vulnerable to attacks on their physical structure, and aiming to discover information they store or handle or to change their operating characteristics. Some attacks involve performing a reading or injecting a signal on an interconnection path, particularly using a laser beam.

The most frequently used means against this type of attack involves using a passive or active shield. Passive shields are generally formed on the circuit's layers of insulator and interconnection paths, that are themselves formed on an active area of a semiconductor substrate. However, such shields can be removed or pierced without the circuit thus protected being able to detect it. On the contrary, active shields are linked to the circuit to enable it to detect when they are removed or pierced. The circuit can then take any appropriate measure to preserve the confidentiality of sensitive information.

For miniaturization reasons in particular, some integrated circuits like those used in video decoders, implement the flip chip technology. This technology involves turning over the substrate of the integrated circuit to place the contact pads formed on the front side of the circuit, directly opposite the contact pads formed on a board such as a printed circuit board. The result is that the backside of the substrate is directly accessible to an attacker wanting to read the content of a memory for example. The protection consisting of forming a passive or active shield on the interconnection layers is thus inappropriate as the shield would then be opposite the printed circuit board and not on the backside of the substrate on which the integrated circuit is formed.

FIG. 1 schematically represents an integrated circuit CI in cross-section. The integrated circuit CI comprises an active area AL formed on a substrate SUB made of a semiconductor material, and layers of interconnection paths ML formed on the active area, alternated with insulating layers. The integrated circuit CI also comprises on its front side connection balls SD deposited on contact pads, in electrical contact with interconnection paths of the integrated circuit. To connect it to other circuits (not represented), the integrated circuit CI is turned over so as to weld the connection balls SD onto contact pads formed on a front side of a larger board SB1, for example a printed circuit board (PCB). Interconnection paths ITC are also formed in one or more layers on the board SB1. The backside of the board SB1 may comprise contact pads on which connection balls BP are deposited.

An attack of the integrated circuit CI thus connected onto the board SB1 can involve thinning down, by grinding, the circuit from the backside, i.e., the inactive side of the substrate, until the active area AL is reached. To show an attack of this type, FIG. 2 schematically represents a cross-section of the circuit CI, after the thinning step. This grinding step can reduce the thickness of the circuit CI from about 500 μm to a few tens of micrometers. This thinning step aims to free the active area AL so as to make it directly accessible by a laser beam LB. A laser beam can indeed be used to read by photo-electric effect the content of a memory or of registers formed in the area AL or to detect signals sent by interconnection lines.

BRIEF SUMMARY

Some embodiments relate to a method for detecting an attack by laser beam on an electronic microcircuit, comprising forming the microcircuit on a semiconductor substrate, the microcircuit comprising a circuit to be protected against attacks, the method comprising: forming photodiodes between components of the circuit to be protected, forming a comparing circuit configured to compare a signal supplied by each photodiode with a threshold value, and forming a signal circuit configured to activate a detection signal when a signal at output of one of the photodiodes crosses the threshold value.

According to one embodiment, the comparing circuit compares the signal supplied by each photodiode with a first threshold value chosen to distinguish whether the photodiode is not subjected to any light intensity or receives a light intensity.

According to one embodiment, the comparing circuit compares the signal supplied by each photodiode with a second threshold value, the second threshold value being chosen to distinguish whether the photodiode receives a light intensity corresponding to an ambient light or a laser beam used to attack the microcircuit.

According to one embodiment, the photodiodes are distributed over the circuit to be protected of the microcircuit according to a random configuration or as close as possible to sensitive components of the circuit to be protected.

According to one embodiment, the photodiodes are distributed over the circuit to be protected of the microcircuit according to a matrix configuration in rows and in columns transversal to the rows.

Some embodiments also relate to a microcircuit comprising a circuit to be protected against attacks by laser beam, photodiodes positioned between components of the circuit to be protected, and a detector circuit linked to the photodiodes, to compare light intensity signals supplied by the photodiodes with a threshold value, and to activate a detection signal when one of the light intensity signals crosses the threshold value.

According to one embodiment, the detector circuit comprises a first comparator linked to the photodiodes to compare the light intensity signal supplied by each photodiode with a first threshold value chosen to distinguish whether the photodiode is not subjected to any light intensity or receives a light intensity.

According to one embodiment, the detector circuit comprises a second comparator linked to the photodiodes to compare the light intensity signal supplied by each photodiode with a second threshold value chosen to distinguish whether the photodiode receives a light intensity corresponding to an ambient light or a laser beam used to attack the microcircuit.

According to one embodiment, the photodiodes are distributed over the circuit to be protected of the microcircuit according to a random configuration or as close as possible to sensitive components of the circuit to be protected.

According to one embodiment, the photodiodes are distributed over the circuit to be protected of the microcircuit according to a matrix configuration in rows and in columns transversal to the rows.

BRIEF DESCRIPTION OF THE SEVERAL VIEWS OF THE DRAWINGS

Some examples of embodiments of the present disclosure will be described below in relation with, but not limited to, the following figures, in which:

FIGS. 1 and 2 described above, schematically represent in a cross-section an integrated circuit connected onto a printed circuit board, according to know art.

FIG. 3 is a schematic view of the front side of an integrated circuit equipped with a protection device, according to one embodiment.

FIG. 4 schematically represents a circuit for detecting an attack on the integrated circuit of FIG. 3, according to one embodiment.

FIGS. 5A, 5B are schematic cross-section views of parts of the integrated circuit in FIG. 3.

DETAILED DESCRIPTION

Figure 6:
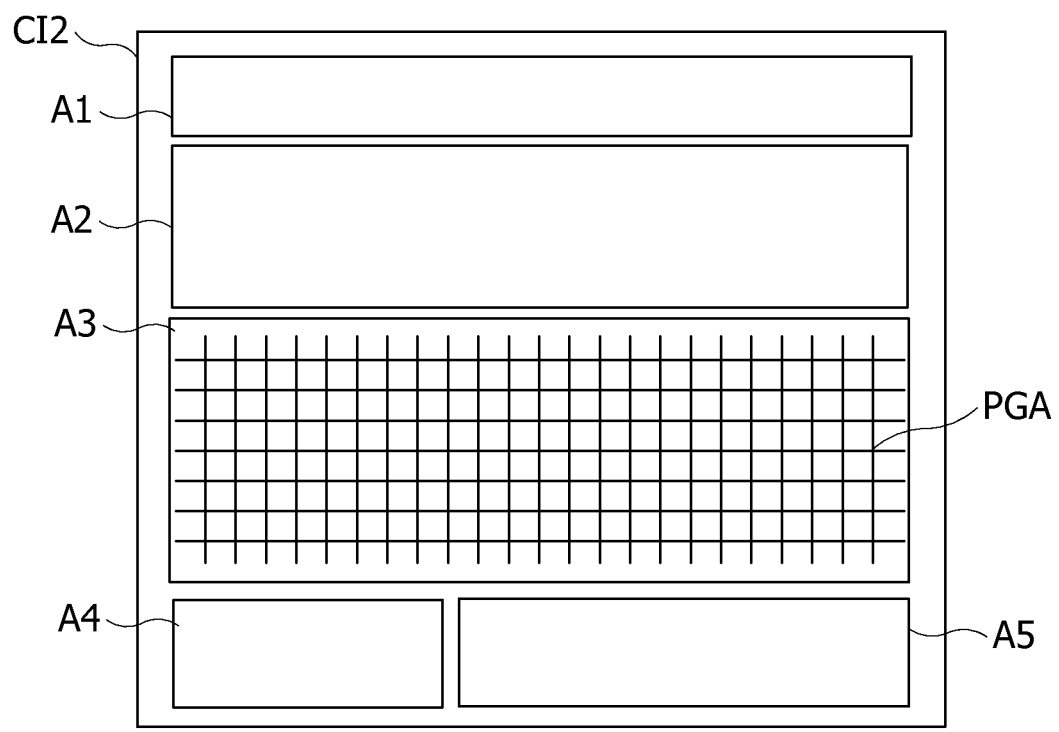
FIG. 6 is a schematic view of the front side of an integrated circuit equipped with a protection device, according to another embodiment.

The integrated circuit CI of FIGS. 1 and 2 could be protected against the type of attack described above by forming an active shield on its backside. However, the production of such a protective shield is difficult. The main difficulty lies in connecting the shield to the active layer AL of the circuit CI formed from the other side of the circuit. Such connection involves forming vias passing through the substrate SUB, which limit the thickness of the substrate. The formation of through vias involves specific techniques, particularly to form deep holes that are not always available on present-day production lines. In addition, such vias can be easily located by an attacker who can then neutralize the protection provided by the shield. Furthermore, the formation of the shield on the backside of the circuit CI involves additional manufacturing steps that increase the manufacturing cost of the circuit. The formation of vias to connect the shield to the circuit would introduce additional manufacturing steps and costs.

It is thus desirable to be capable of efficiently protecting an integrated circuit against backside attacks. It is also desirable that this protection does not increase the manufacturing cost of the integrated circuit.

FIG. 3 represents the front side of an integrated circuit CI1. The integrated circuit comprises several circuits A1, A2, A3, A4, AS, such as for example a power supply circuit, processing circuits, and logic control circuits.

According to one embodiment, the integrated circuit CI1 comprises a protection device comprising one or more photodiodes PHD disposed in or in the vicinity of sensitive areas of the integrated circuit. Each photodiode PHD supplies a signal representative of a light intensity received by the photodiode. In the example in FIG. 3, the photodiodes PHD are distributed over an area A3, for example a secured ROM memory. When they come off the production line, the photodiodes PHD of the circuit CI1 are on one side insulated by the semiconductor substrate that has a thickness of several hundreds of micrometers, and on the other side, covered by several layers of conductive interconnection paths and insulating material. Therefore, the photodiodes PHD do not receive any light or only a very low light intensity. The light intensity signal supplied by each of the photodiodes PHD thus corresponds normally to a noise or dark current. Additionally, packaging of a microchip can be implemented that provides a known degree of shielding—including substantially complete shielding—of the photodiodes PHD from light. Thus, any detectable light, or any detectable increase of light beyond a known value that reaches a photodiode can be an indication of a change in the packaging. For the purposes of the claim language, the term "packaging" is to be construed broadly as encompassing any element that blocks or attenuates light that would be detectable by a photodiode formed on a semiconductor substrate. Packaging can therefore include, for example, the semiconductor substrate on which the diode is formed, traditional semiconductor packaging, and circuit boards and other substrates on which a microchip may be mounted. If the substrate of the circuit CI1 is thinned from its backside, as shown in FIGS. 1 and 2, or the packaging is otherwise disturbed to free the active layer AL, at least in the area A3, one or more of the photodiodes PHD can be subjected to a light source and thus supply a light intensity signal having an amplitude greater than the signal it supplies when the circuit has not been subjected to such thinning The light thus detected by one of the photodiodes PHD can come from an ambient light and/or a laser beam. The light intensity signal supplied by each of the photodiodes PHD can thus be used to detect such an attack.

Therefore, FIG. 4 represents an example of an attack detector circuit DETC. The circuit DETC comprises a multiplexer MUX comprising inputs each receiving a photodiode light intensity signal, representative of the light intensity received by one of the photodiodes PHD. The output of the multiplexer MUX is connected to an input of a comparator CP1 another input of which receives a threshold value Vr1, for example a reference voltage. The threshold value Vr1 is chosen just above the highest value of noise or dark signal supplied by the photodiodes PHD, so as not to trigger a false alarm. The threshold value Vr1 can take into account the light intensity signal supplied by a photodiode on the thinned substrate when the substrate is subjected to a certain light intensity.

The output of the comparator CP1 is connected to the input of a processing circuit WB which can be configured merely to activate an attack detection signal DT when the comparator CP1 indicates that a light intensity signal coming from a photodiode is above the threshold value Vr1. The circuit WB can also be configured to take or trigger any appropriate measure in the event of an attack, like erasing one or more memories containing sensitive data, locking or cutting off the power supply of the integrated circuit CI1 or of certain circuits of the integrated circuit CI1, etc. The activation of the detection signal DT can be simply stored in a permanent manner in a circuit of the microcircuit. Such storing can then be used every time the microcircuit is started to put the latter into a degraded operating mode.

The multiplexer MUX can be controlled to successively acquire the light intensity signal at output of each photodiode PHD, and send it to the comparator CP1.

According to another embodiment, provision may further be made for as many comparators as photodiodes PHD, each comparator comparing the light intensity signal at output of a photodiode with the threshold value Vr1. The output of each comparator is connected to an input of an OR logic gate, replacing the multiplexer MUX and supplying the detection signal DT. The signal DT is thus in the active state when at least one of the photodiodes PHD detects a light intensity above the light intensity threshold corresponding to the threshold value Vr1.

According to one embodiment, the circuit DETC comprises a second comparator CP2 to compare the light intensity signal of a photodiode, selected by the multiplexer MUX with another threshold value Vr2, greater than the threshold value Vr1.

The threshold value Vr2 is for example a reference voltage chosen to distinguish when a photodiode is merely subjected to an ambient light and when the photodiode is subjected to a laser beam used to attack the integrated circuit, once thinned. The comparator CP2 supplies the circuit WB with a comparison signal. Therefore, the circuit WB can select a protective measure according to the signals supplied by the two comparators CP1, CP2. If the circuit CI1, once thinned, is kept in a dark environment, the comparators CP1, CP2 may not detect anything. However, the comparators CP1, CP2 can simultaneously supply an active signal when a laser beam passes over one of the photodiodes PHD. The detection signal DT can simply indicate whether the maximum light intensity detected by the photodiodes is lower than the threshold value Vr1, ranging between the threshold values Vr1 and Vr2, or above the threshold value Vr2. The detection signal DT can also indicate numbers of photodiodes having supplied a light intensity signal lower than the threshold value Vr1, ranging between the threshold values Vr1 and Vr2, and above the threshold value Vr2.

The formation of photodiodes in an integrated circuit is perfectly compatible with manufacturing techniques, and particularly photolithography techniques, implemented to produce logic circuits or memories, and requires no additional manufacturing steps. To illustrate this advantage, FIGS. 5A, 5B represent multi-layer structures formed in the active area of a semiconductor substrate to produce an n-channel MOS transistor, referenced MT, and one of the photodiodes PHD. The transistor MT and the photodiode PHD can be formed on a same substrate PSB made of a semiconductor material, which can be covered with a layer PEP in a P-doped semiconductor material (silicon). The transistor MT is formed in P-doped well PW, while the photodiode PHD is formed in an N-doped well NW like the P-channel MOS transistors. The wells PW and NW can be isolated from the substrate by a relatively deep trench IS surrounding the wells, and filled with an electrically insulating material. The transistor MT comprises two N+-doped areas constituting the source SD and the drain DD of the transistor MT, formed in the well PW, while the photodiode PHD comprises an N+-doped area PD formed in the well NW. The gate GT of the transistor MT is formed by a layer made of polysilicon on an area of the well PW between the source SD and the drain DD. The source SC, gate GC and drain DC contacts of the transistor MT and the contact PC of the photodiode PHD are then formed by a metal deposit.

In FIG. 3, the photodiodes PHD are disposed as close as possible to the sensitive components of the area to be protected A3, or distributed out according to a random configuration. According to another embodiment shown in FIG. 6, the photodiodes are distributed over the area to be protected according to a matrix configuration, in rows and in columns transversal to the rows. FIG. 6 represents an integrated circuit CI2 which differs from the circuit CI1 in FIG. 3 in that the area A3 to be protected is covered with a matrix network of photodiodes PGA. By choosing a sufficiently small mesh width for the network PGA, a selective attack of a part of the area A3 can be made impossible without a photodiode of the network PGA detecting the presence of a laser beam, even if the circuit is kept in a dark environment, or kept lit by a radiation to which the photodiodes are insensitive. In the case of advanced CMOS technologies (>28 nm), the sensitivity of the photodiodes can be extended using germanium (or another similar metal). For this purpose, such a material can be added to the photodiodes by epitaxy (without requiring any other operation compared to a classic method of manufacturing photodiodes). Furthermore, by disposing the photodiodes as close as possible to sensitive components or by providing a high number of photodiodes on the area to be protected, it can be difficult for an attacker to mask all the photodiodes to prevent the detection of a laser beam, without also masking the circuit being subjected to an attack.

It will be understood by those skilled in the art that various alternative embodiments and various applications of the present disclosure are possible. In particular, the disclosure is not limited to a specific protective measure triggered when an attack is detected. Indeed, the detection signal DT can merely be supplied outside the microcircuit to a warning device. This external warning device can furthermore be programmable according to several levels of security to conduct or trigger specific actions when error conditions are met, according to a level of security it has received for example from the microcircuit.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   forming a microcircuit, forming the microcircuit including:
      forming an active layer on a front side of a semiconductor substrate, forming conductive layers on the active layer, each conductive layer including conducive tracks, forming insulating layers between the conductive layers, forming in the active and conductive layers a circuit to be protected; forming a plurality of photodiodes in the active layer between components of the circuit to be protected, each of the photodiodes being configured to supply a respective light intensity signal representative of a light intensity received by the photodiode from a back side of the substrate opposite to the front side;
      forming a detector circuit linked to the photodiodes, the detector circuit being configured to compare the light intensity signals with a first threshold value, and to activate a detection signal when one of the light intensity signals crosses first the threshold value, wherein forming the detector circuit comprises:
         forming a first comparator linked to the photodiodes and configured to compare each light intensity signal with the first threshold value chosen to distinguish whether the photodiode is not subjected to any light intensity or receives a light intensity; and forming a second comparator linked to the photodiodes to compare each light intensity signal with a second threshold value chosen to distinguish whether one or more of the photodiodes receives a light intensity corresponding to an ambient light or a laser beam used to attack the microcircuit, the second threshold value being different from the first threshold value.

2. The method according to claim 1, wherein the photodiodes are configured to receive light from the back side of the substrate subsequent to a partial removal of the substrate from the back side.

3. The method according to claim 1, comprising establishing the first threshold value at a level that will be exceeded by a photodiode signal that is subjected to substantially any light intensity greater than zero.

4. The method according to claim 1, comprising establishing the first threshold value at a level that is slightly greater than a signal produced when a photodiode is in complete darkness.

5. The method according to claim 1, comprising:
packaging the microcircuit and photodiodes in a way that prevents light from being detected by the photodiodes during normal operation of the microcircuit.

6. The method according to claim 1, comprising:
packaging the microcircuit and photodiodes in a way that prevents the photodiodes from producing a signal that exceeds the first threshold during normal operation of the microcircuit.

7. The method according to claim 1, wherein forming the photodiodes on the semiconductor substrate comprises forming the photodiodes over the circuit to be protected according to a random distribution.

8. The method according to claim 1, wherein forming the photodiodes on the semiconductor substrate comprises forming the photodiodes over the circuit to be protected according to a matrix configuration in rows and in columns.

9. The method according to claim 1, wherein forming the photodiodes on the semiconductor substrate comprises forming individual ones of the photodiodes over the circuit to be protected in close proximity with respective individual components of the circuit to be protected.

10. A microcircuit, comprising: a semiconductor substrate; an active layer formed on a front side of the substrate;
conductive layers formed on the active layer of the substrate, each including conductive tracks;
insulating layers formed between the conductive layers; a circuit to be protected, formed in the active and conductive layers; a plurality of photodiodes formed in the active layer among components of the circuit to be protected, each of the photodiodes being configured to supply respective a light intensity signal representative of a light intensity received by the photodiode from a back side of the substrate opposite to the front side; and
a detector circuit linked to the photodiodes, the detector circuit being configured to compare the light intensity signals with a first threshold value, and to activate a detection signal when one of the light intensity signals crosses the first threshold value, wherein the detector circuit comprises:
a first comparator linked to the photodiodes and configured to compare each light intensity signal with the first threshold value chosen to distinguish whether the photodiode is not subjected to any light intensity or receives a light intensity; and
a second comparator linked to the photodiodes to compare each light intensity signal with a second threshold value chosen to distinguish whether one or more of the photodiodes receives a light intensity corresponding to an ambient light or a laser beam used to attack the microcircuit, the second threshold value being different from the first threshold value.

11. The microcircuit according to claim 10, wherein the photodiodes are configured to receive light from the back side of the substrate subsequent to a partial removal of the substrate from the back side.

12. The microcircuit according to claim 10, wherein the photodiodes are distributed over the circuit to be protected of the microcircuit according to a random configuration or as close as possible to sensitive components of the circuit to be protected.

13. The microcircuit according to claim 11, wherein the photodiodes are distributed over the circuit to be protected of the microcircuit according to a matrix configuration in rows and in columns transversal to the rows.

14. A device, comprising: a semiconductor substrate; an active layer formed on a front side of the substrate;
conductive layers formed on the active layer of the substrate, each including conductive tracks;
insulating layers formed between the conductive layers; a first integrated circuit formed in the active and conductive layers; a plurality of photodiodes formed in the active layer and distributed within an area defined by the first integrated circuit, each of the photodiodes being configured to detect light applied to the photodiode from a back side of the substrate opposite to the front side;
a second integrated circuit formed in the active and conductive layers and having a plurality of inputs, each coupled to a respective one of the plurality of photodiodes, the second integrated circuit being configured to detect a level of light exceeding a first threshold that reaches any of the plurality of photodiodes from the back side of the substrate, and to produce a corresponding detection signal; and
a packaging of the first integrated circuit and plurality of diodes configured to prevent light exceeding the first threshold from reaching any of the plurality of photodiodes, wherein the second integrated circuit comprises:
a first comparator configured to compare a signal produced by one of the plurality of diodes with a first reference value that corresponds to the first threshold; and
a second comparator configured to detect a level of light exceeding a second threshold, greater than the first threshold, that reaches any of the plurality of photodiodes, and to produce a detection signal corresponding to the second threshold, the second threshold being different from the first threshold.

15. The device of claim 14, wherein the photodiodes are configured to receive light from the back side of the substrate subsequent to a partial removal of the substrate from the back side.

16. The device of claim 14, wherein the second integrated circuit comprises a multiplexer configured to couple each of the plurality of diodes in turn to the first comparator.

17. The device of claim 14, wherein the first comparator is one of a plurality of first comparators comprised by the second integrated circuit each coupled to a respective one of the plurality of diodes.

18. A method, comprising:
detecting, using a microcircuit, light impinging on a portion of a circuit to be protected; and producing, using the microcircuit, a detection signal if the detected light exceeds a first threshold value, the microcircuit including: a semiconductor substrate; an active layer formed on a front side of the substrate; conductive layers formed on the active layer of the substrate, each including conductive tracks; insulating layers formed between the conductive layers;
the integrated circuit to be protected, formed in the active and conductive layers;
a plurality of photodiodes formed in the active layer among components of the circuit to be protected, and a detector circuit linked to the photodiodes, wherein:
the detector circuit comprises a first comparator linked to the photodiodes and configured to compare each light intensity signal with the first threshold value chosen to distinguish whether the photodiode is not subjected to any light intensity or receives a light intensity;
the detector circuit comprises a second comparator linked to the photodiodes to compare each light intensity signal with a second threshold value chosen to distinguish whether one or more of the photodiodes receives a light intensity corresponding to an ambient light or a laser beam used to attack the microcircuit, the second threshold value being different from the first threshold value;

the detecting includes each of the photodiodes supplying a respective light intensity signal representative of a light intensity received by the photodiode from a back side of the substrate opposite to the front side; and the producing includes the first comparator comparing the light intensity signals with the first threshold value and activating the detection signal when one of the light intensity signals crosses the first threshold value; and the second comparator producing a comparison signal based on a comparison of each light intensity signal with the second threshold value.

19. The method of claim 18 wherein the producing includes producing the detection signal if any light is detected.

20. The method of claim 18 wherein the producing includes producing the detection signal indicating a degree by which the detected light exceeds the first threshold value.

21. The method of claim 18, comprising making irrevocable alterations to the integrated circuit if the detection signal is produced.

* * * * *

UNITED STATES PATENT AND TRADEMARK OFFICE
CERTIFICATE OF CORRECTION

| | |
|---|---|
| PATENT NO. | : 9,117,833 B2 |
| APPLICATION NO. | : 13/901378 |
| DATED | : August 25, 2015 |
| INVENTOR(S) | : Stephane Mougin et al. |

It is certified that error appears in the above-identified patent and that said Letters Patent is hereby corrected as shown below:

Claims

Column 7, Line 62, Claim 13:
"13. The microcircuit according to claim 11, wherein the" should read, --13. The microcircuit according to claim 10 wherein the--.

Signed and Sealed this
Fifth Day of April, 2016

Michelle K. Lee
*Director of the United States Patent and Trademark Office*